(12) United States Patent
Oliver et al.

(10) Patent No.: US 8,115,597 B1
(45) Date of Patent: Feb. 14, 2012

(54) RFID TAGS WITH SYNCHRONOUS POWER RECTIFIER

(75) Inventors: Ronald A. Oliver, Seattle, WA (US); John D. Hyde, Corvallis, OR (US); Charles J. T. Peach, Seattle, WA (US)

(73) Assignee: Impinj, Inc., Seattle, WA (US)

(*) Notice: Subject to any disclaimer, the term of this patent is extended or adjusted under 35 U.S.C. 154(b) by 1012 days.

(21) Appl. No.: 12/042,117

(22) Filed: Mar. 4, 2008

Related U.S. Application Data

(60) Provisional application No. 60/905,417, filed on Mar. 7, 2007.

(51) Int. Cl.
*H04Q 5/22* (2006.01)

(52) U.S. Cl. ............... 340/10.1; 340/572.1; 340/572.2; 340/572.3; 340/572.4; 340/572.5; 340/572.6; 340/572.7; 340/572.8; 340/572.9; 340/10.2; 340/10.3; 340/10.31; 340/10.32; 340/10.33; 340/10.34; 340/10.4; 340/10.41; 340/10.42; 340/10.5; 340/10.51; 340/10.52; 235/375; 235/376; 235/377; 235/378; 235/379; 235/380; 235/381; 235/382; 235/382.5; 235/383; 235/384; 235/385

(58) Field of Classification Search ........ 340/10.1–10.6, 340/572.1–572.9; 235/380, 235, 375–385
See application file for complete search history.

(56) References Cited

U.S. PATENT DOCUMENTS

| | | | | |
|---|---|---|---|---|
| 2,986,652 A * | 5/1961 | Eachus | ................. | 326/130 |
| 3,479,529 A * | 11/1969 | Van Dine | ................. | 327/230 |
| 3,551,705 A * | 12/1970 | Juliusburger | ................. | 327/263 |
| 4,032,838 A * | 6/1977 | Minami et al. | ................. | 323/349 |
| 5,394,367 A | 2/1995 | Downs et al. | | |
| 5,467,081 A | 11/1995 | Drews et al. | | |
| 5,535,164 A | 7/1996 | Adams et al. | | |
| 5,606,323 A * | 2/1997 | Heinrich et al. | ........... | 340/10.34 |
| 5,630,216 A * | 5/1997 | McEwan | ................. | 455/215 |
| 5,659,502 A * | 8/1997 | Sali et al. | ................. | 365/185.18 |
| 5,874,896 A * | 2/1999 | Lowe et al. | ................. | 340/572.1 |
| 5,936,454 A * | 8/1999 | Joardar | ................. | 327/432 |
| 6,023,188 A * | 2/2000 | Lee et al. | ................. | 327/536 |
| 6,040,773 A * | 3/2000 | Vega et al. | ................. | 340/572.1 |
| 6,147,605 A * | 11/2000 | Vega et al. | ................. | 340/572.7 |
| 6,154,014 A * | 11/2000 | Suu | ................. | 323/222 |
| 6,252,508 B1 * | 6/2001 | Vega et al. | ................. | 340/572.1 |
| 6,297,974 B1 * | 10/2001 | Ganesan et al. | ................. | 363/60 |
| 6,320,230 B1 * | 11/2001 | Yu | ................. | 257/355 |
| 6,496,112 B1 * | 12/2002 | Vega | ................. | 340/572.1 |
| 6,753,704 B2 * | 6/2004 | Desgrez et al. | ................. | 327/9 |
| 6,859,085 B2 * | 2/2005 | Watanabe et al. | ................. | 327/359 |

(Continued)

OTHER PUBLICATIONS

EPCglobal, Inc "*Specification of RFID Air Interface-EPC Radio-Frequency Identity Protocols Class-1 Generation-2 UHF RFID Protocol for Communications at 860 MHz-960 MHz, Version 1.1.0.*" (a.k.a. "The Gen 2 Spec") EPCglobal Inc. Dec. 17, 2005.

(Continued)

*Primary Examiner* — George Bugg
*Assistant Examiner* — Paul Obiniyi
(74) *Attorney, Agent, or Firm* — Turk IP Law, LLC

(57) ABSTRACT

The present disclosure provides a power rectifier for a Radio Frequency Identification tag circuit. The rectifier is constructed from a pair of complementary MOS transistors. Gates of the transistors have predetermined voltages applied to them. The applied voltages bias the transistors to near their active operating region. During the same time additional control signals are applied to the gates of the transistors, the control signals are synchronous, but out of phase, with each other.

15 Claims, 17 Drawing Sheets

SYNCHRONOUS POWER RECTIFIER

U.S. PATENT DOCUMENTS

| | | | |
|---|---|---|---|
| 6,937,514 B2* | 8/2005 | Hasegawa | 365/185.12 |
| 6,946,950 B1* | 9/2005 | Ueno et al. | 340/10.1 |
| 7,046,071 B1* | 5/2006 | Conn et al. | 327/407 |
| 7,108,183 B1 | 9/2006 | Cox, Jr. | |
| 7,167,090 B1* | 1/2007 | Mandal et al. | 340/538.14 |
| 7,321,300 B2 | 1/2008 | Friedrich et al. | |
| 7,570,034 B2* | 8/2009 | Nitta et al. | 323/259 |
| 7,768,406 B1* | 8/2010 | Peach et al. | 340/572.7 |
| 7,853,236 B2* | 12/2010 | Ootaka et al. | 455/343.3 |
| 7,872,582 B1 | 1/2011 | Diorio | |
| 2002/0008989 A1* | 1/2002 | Honigschmid | 365/158 |
| 2003/0132784 A1* | 7/2003 | Desgrez et al. | 327/9 |
| 2004/0212008 A1* | 10/2004 | Hasegawa | 257/316 |
| 2004/0246103 A1 | 12/2004 | Zukowski | |
| 2004/0257899 A1* | 12/2004 | Lee et al. | 365/230.03 |
| 2005/0073197 A1 | 4/2005 | Matsubara et al. | |
| 2005/0130389 A1 | 6/2005 | Yamazaki et al. | |
| 2005/0162145 A1* | 7/2005 | Smith et al. | 323/312 |
| 2006/0104134 A1* | 5/2006 | Kim et al. | 365/201 |
| 2007/0128760 A1* | 6/2007 | Subramanian et al. | 438/57 |
| 2007/0176756 A1 | 8/2007 | Friedrich | |
| 2007/0199988 A1 | 8/2007 | Labgold et al. | |
| 2007/0210776 A1* | 9/2007 | Oka | 323/283 |
| 2007/0273481 A1* | 11/2007 | Soleimani | 340/10.1 |
| 2008/0001094 A1* | 1/2008 | Korthout et al. | 250/370.07 |
| 2008/0001724 A1 | 1/2008 | Soleimani et al. | |
| 2008/0001725 A1 | 1/2008 | White et al. | |
| 2008/0080214 A1 | 4/2008 | Umeda et al. | |
| 2008/0129506 A1 | 6/2008 | Schuessier | |
| 2008/0158926 A1* | 7/2008 | Umeda et al. | 363/127 |
| 2009/0195289 A1* | 8/2009 | Subramanian et al. | 327/328 |
| 2010/0148845 A1* | 6/2010 | Kato | 327/308 |
| 2010/0245212 A1* | 9/2010 | Dallas et al. | 345/32 |

OTHER PUBLICATIONS

EPCglobal, Inc *"Specification of RFID Air Interface-EPC Radio-Frequency Identity Protocols Class-1 Generation-2 UHF RFID Protocol for Communications at 860 MHz-960 MHz, Version 1.0.8."* (a.k.A. "The Gen 2 Spec") EPCglobal Inc. Dec. 14, 2004.

Specification for RFID Air Interface: EPCTM Radio-Frequency Identity Protocols Class-1 Generation-2 UHF RFID Protocols for Communications at 860 MHz-960 MHz Version 1.2.0, 2004-2008, EPCglobal Inc., Oct. 23, 2008, 1-108.

"Declaration of Stacy L. Jones authenticating attached website materials", www.autoid.org/SC31/sc_31_wg4_sg3.htm, Sep. 1, 2006.

Non-Final Office Action U.S. Appl. No. 11/877,054 mailed Mar. 9, 2010.

* cited by examiner

*DICKSON RF "CHARGE PUMP" STAGE*

*SINGLE-ENDED RF DICKSON "CHARGE PUMP" RECTIFIER*

*DIFFERENTIAL RF DICKSON "CHARGE PUMP" RECTIFIER*

*NMOS RF RECTIFIER STAGE*

*SINGLE-ENDED RF NMOS RECTIFIER*

CMOS RF RECTIFIER STAGE

SINGLE-ENDED RF CMOS RECTIFIER

SYNCHRONOUS RECTIFIER STAGE

SYNCHRONOUS RECTIFIER ELEMENT

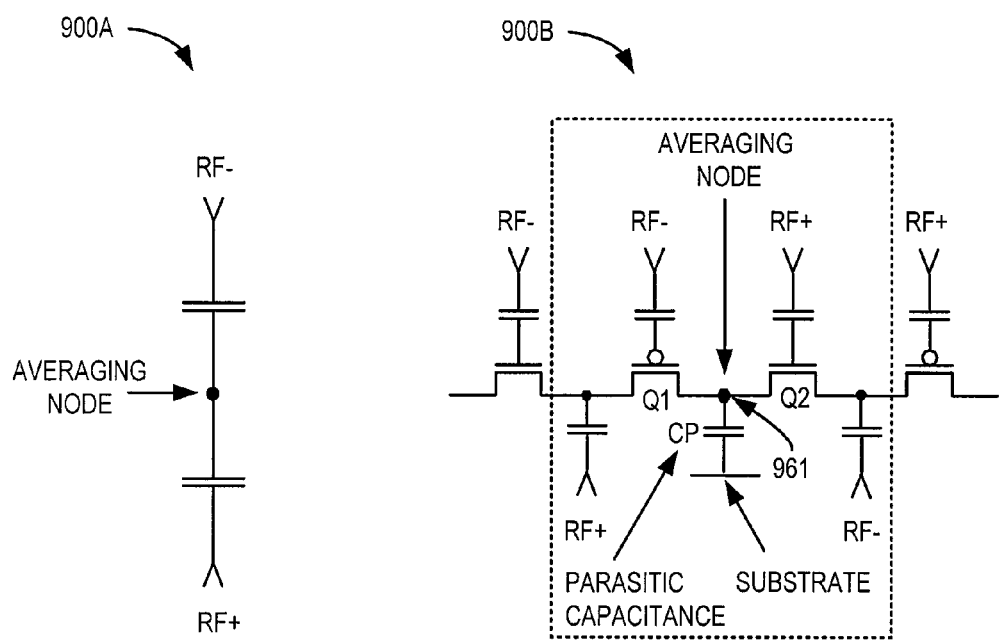
FIG. 9A — CONCEPTUAL REPRESENTATION OF THE AVERAGING NODE
FIG. 9B — SYNCHRONOUS RECTIFIER ELEMENT SHOWING AVERAGING NODE

RECTIFIER CONNECTED FOR "NODAL"
AVERAGING, A NODES LEFT FLOATING

RECTIFIER CONNECTED FOR "LOCAL"
AVERAGING, A NODES COUPLED TOGETHER

PHASES WITHIN THE SYNCHRONOUS RECTIFIER
WITH "NODAL" AVERAGING OPTION

PHASES WITHIN THE SYNCHRONOUS RECTIFIER
WITH "LOCAL" AVERAGING OPTION

PHASES WITHIN THE SYNCHRONOUS RECTIFIER
WITH "GLOBAL" AVERAGING OPTION

IMPROVEMENT IN FORWARD CONDUCTION AND
REVERSE LEAKAGE COMPARED TO PRIOR ART
(SIGNALS ARE REFERENCED TO SOURCE)

RFID TAGS WITH SYNCHRONOUS POWER RECTIFIER

RELATED APPLICATIONS

This patent application claims priority from U.S.A. Provisional Patent Application Ser. No. 60/905,417 filed on Mar. 7, 2007, the disclosure of which is hereby incorporated by reference for all purposes.

This patent application may be found to be pertinent to commonly owned U.S. patent application Ser. No. 11/042,141, filed on the same day as the instant application, listing the same inventors with the instant application, and entitled "RFID TAG WITH DOUBLE-SWITCH RECTIFIER".

FIELD OF THE INVENTION

The present disclosure addresses the field of Radio Frequency IDentification (RFID) systems, and more specifically RFID tags having one or more voltage rectifier circuits.

BACKGROUND

Radio Frequency IDentification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a radio section, a power management section, and frequently a logical section, and a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags do not include an energy storage device, and are called passive tags.

Harvesting sufficient power from the RF wave can be difficult since the voltage of the RF signal is in the range of approximately 200 millivolts, and a typical supply voltage for circuits of the RFID tag is one volt. Additionally, for relatively high-voltage operations, such as, programming and erasing non-volatile memory in the RFID tag, a boosted voltage, as high as 12 volts, may be needed. Due to low available RF signal amplitude that is insufficient to operate the circuitry needed by the RFID tag, the power rectifier circuits typically use charge pumps to increase the output DC voltage.

Complicating matters is that the RF wave received by the RFID tag is not being provided continuously, and can cease to be transmitted by the RFID reader without any notice.

Thus, operation of passive RFID tag converting the low-level RF waveform to a usable voltage requires a rectifier circuit that can generate usable voltage quickly and efficiently.

BRIEF SUMMARY

The present disclosure provides a power rectifier for a Radio Frequency Identification tag circuit. The rectifier is constructed from a pair of complementary MOS transistors. Gates of the transistors have predetermined voltages applied to them. The applied voltages bias the transistors to near their active operating region. During the same time additional control signals are applied to the gates of the transistors, the control signals are synchronous, but out of phase, with each other.

The disclosed power rectifier system maximizes the energy harvest efficiency of the RFID tag circuit.

These and other features and advantages of the invention will be better understood from the specification of the invention, which includes the following Detailed Description and accompanying Drawings.

BRIEF DESCRIPTION OF THE DRAWINGS

The following Detailed Description proceeds with reference to the accompanying Drawings, in which:

FIG. 9A is a conceptual representation of an averaging node of a synchronous rectifier element of FIG. 8B according to an embodiment.

FIG. 9B is a schematic diagram of the synchronous rectifier stage of FIG. 8B showing a location of the averaging node according to an embodiment.

DETAILED DESCRIPTION

Figure 1:
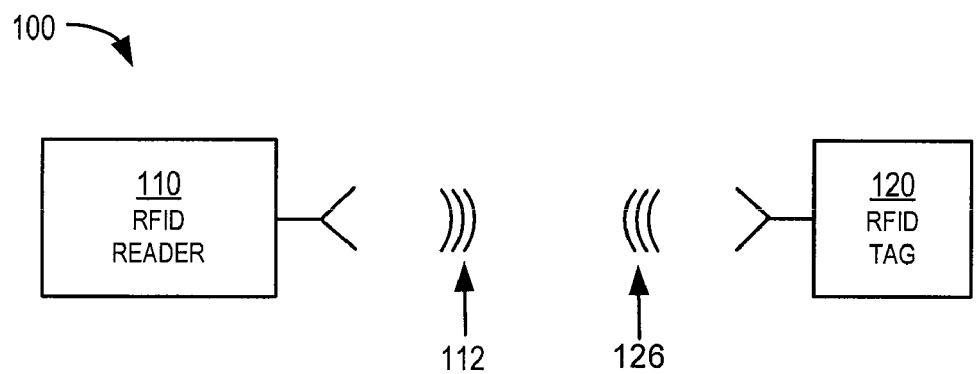
FIG. 1 is a block diagram of an RFID system.

The present invention is now described in more detail. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention might be modified in numerous ways. Among other things, the present invention may be embodied as devices, methods, and so on. Accordingly, the present invention may take the form of an entirely device embodiment, an entirely method embodiment, or an embodiment combining aspects of the above. This description is therefore, not to be taken in a limiting sense.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active or semi-active tag, i.e. having its own power source. Where tag 120 is a passive tag, it is powered from wave 112.

Figure 2:
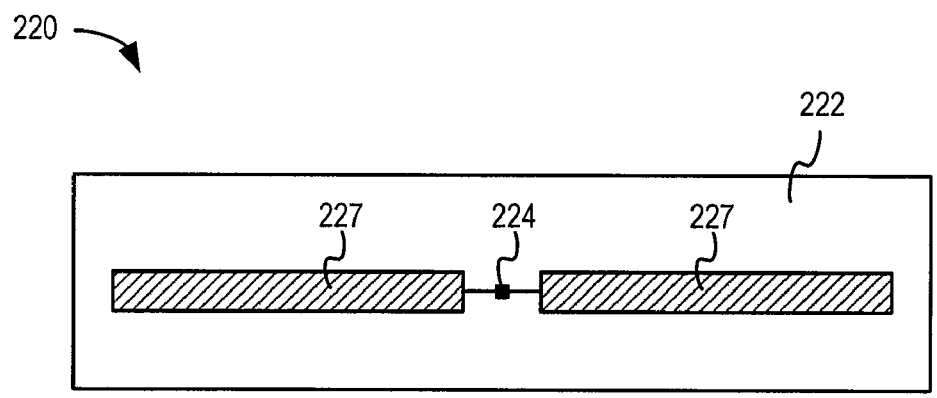
FIG. 2 is a diagram showing components of a passive RFID tag.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes.

Figure 3:
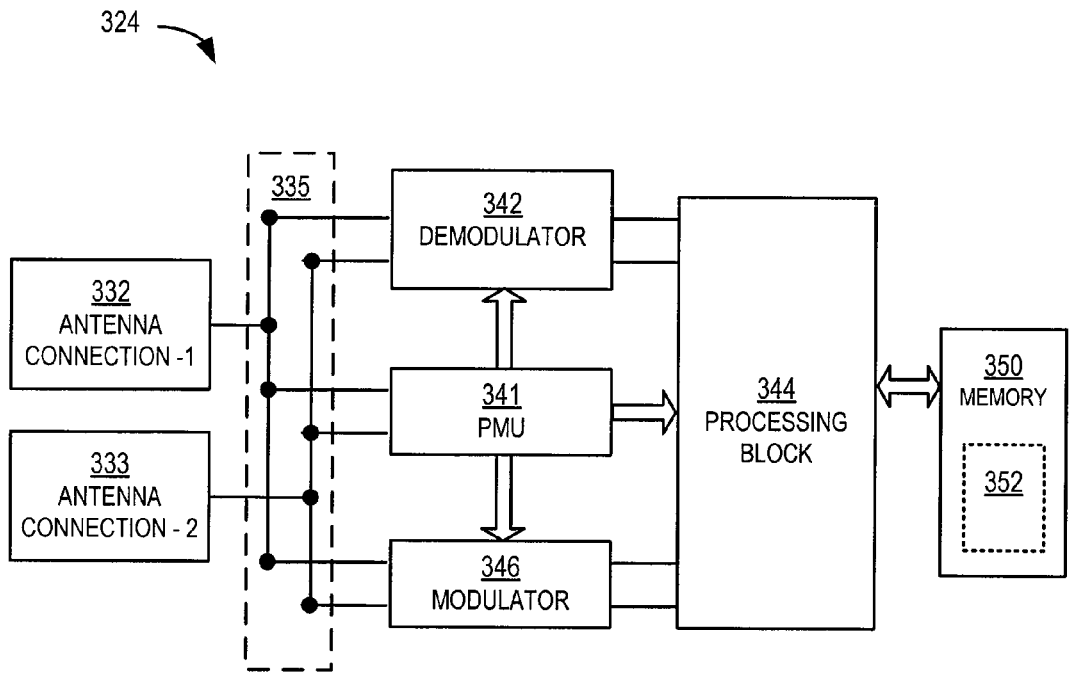
FIG. 3 is a block diagram of an implementation of an electrical circuit formed in an IC of the tag of FIG. 2.

FIG. 3 is a block diagram of an electrical circuit 324. Circuit 324 may be formed on a semiconductor substrate in an IC of an RFID tag, such as IC 224 of FIG. 2. Circuit 324 has a number of main components that are described in this document. Circuit 324 may have a number of additional components from what is shown and described, or different components, depending on the exact implementation.

Circuit 324 includes at least two antenna connections 332, 333, which are suitable for coupling to one or more antenna segments (not shown in FIG. 3). Antenna connections 332, 333 may be made in any suitable way, such as pads and so on. In a number of embodiments, more than two antenna connections are used, especially in embodiments where more antenna segments are used.

Circuit 324 includes a section 335. Section 335 may be implemented as shown, for example as a group of nodes for proper routing of signals. In some embodiments, section 335 may be implemented otherwise, for example to include a receive/transmit switch that can route a signal, and so on.

Circuit 324 also includes a Power Management Unit (PMU) 341. PMU 341 may be implemented in any way known in the art, for harvesting raw RF power received via antenna connections 332, 333. In some embodiments, PMU 341 includes at least one rectifier, and so on.

In operation, an RF wave received via antenna connections 332, 333 is received by PMU 341, which in turn generates power for components of circuit 324

Circuit 324 additionally includes a demodulator 342. Demodulator 342 demodulates an RF signal received via antenna connections 332, 333. Demodulator 342 may be implemented in any way known in the art, for example including an attenuator stage, amplifier stage, and so on.

Circuit 324 further includes a processing block 344. Processing block 344 receives the demodulated signal from demodulator 342, and may perform operations. In addition, it may generate an output signal for transmission.

Processing block 344 may be implemented in any way known in the art. For example, processing block 344 may include a number of components, such as a processor, memory, a decoder, an encoder, and so on.

Circuit 324 additionally includes a modulator 346. Modulator 346 modulates an output signal generated by processing block 344. The modulated signal is transmitted by driving antenna connections 332, 333, and therefore driving the load presented by the coupled antenna segment or segments. Modulator 346 may be implemented in any way known in the art, for example including a driver stage, amplifier stage, and so on.

In one embodiment, demodulator 342 and modulator 346 may be combined in a single transceiver circuit. In another embodiment, modulator 346 may include a backscatter transmitter or an active transmitter. In yet other embodiments, demodulator 342 and modulator 346 are part of processing block 344.

Circuit 324 additionally includes a memory 350, which stores data 352. Memory 350 is preferably implemented as a Nonvolatile Memory (NVM), which means that data 352 is retained even when circuit 324 does not have power, as is frequently the case for a passive RFID tag.

It will be recognized at this juncture that the shown components of circuit 324 can be those of a circuit of an RFID reader according to the invention, with or without needing PMU 341. Indeed, an RFID reader can be powered differently, such as from a wall outlet, a battery, and so on. Additionally, when circuit 324 is configured as a reader, processing block 344 may have additional Inputs/Outputs (I/O) to a terminal, network, or other such devices or connections.

Figure 4:
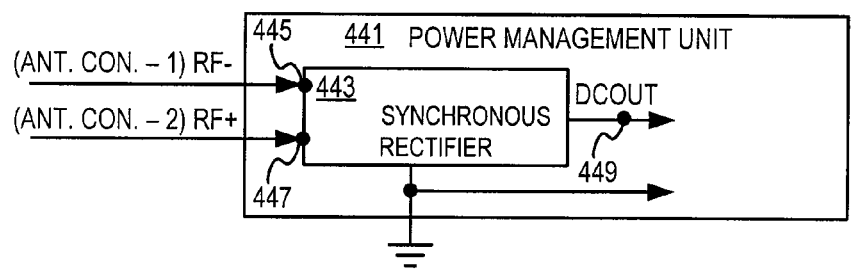
FIG. 4 is a block diagram illustrating components of a Power Management Unit of the circuit of FIG. 3 according to embodiments.

FIG. 4 is a block diagram that illustrates a component of a Power Management Unit 341 of the circuit of FIG. 3. Power Management Unit 341 includes at least one synchronous rectifier 443. Synchronous rectifier 443 is coupled to a terminal of an antenna (not shown) at input node 445 to receive phase RF− of an RF signal, and is also coupled to another terminal of the antenna (not shown) at input node 447 to receive a phase RF+ signal detected by the antenna. As it will be explained in more detail below, synchronous rectifier 443 converts induced alternating current ("AC") voltage captured by the antenna segments into usable DC voltage DCOUT 449. The DC voltage can be used to power the operations of RFID tag 220. Typically, the phase RF− and phase RF+ of the RF signals are complementary, that is, 180 degrees out of phase relative to one another.

Figure 5A:
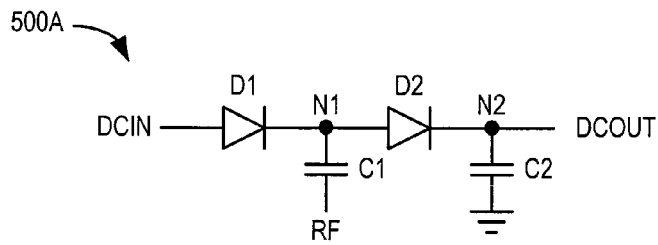
FIG. 5A is a schematic diagram of a Dickson RF "Charge Pump" stage according to prior art.

FIG. 5A illustrates a Dickson RF charge-pump stage 500A. The charge-pump stage 500A includes two diodes D1 and D2 that are coupled in series at node N1. Capacitor C1 is connected between N1 and an RF input signal. Capacitor C2 is connected between a ground and an output terminal DCOUT. During the negative half of its AC cycle, the RF input signal forward biases diode D1 and charge capacitor C1. At this time, the voltage V1 at node N1 is equal to DCIN−VT1, where VT1 is the threshold voltage of diode D1. During the positive half of its AC cycle, the RF input signal reverse biases diode D1 and forward biases diode D2. At this time the voltage V1 at node N1 is equal to DCIN−VT1+2*VA, where the RF input signal is given by VA*sin($\omega$t). Because diode D2 is forward biased, it transfers charge from capacitor C1 to capacitor C2, and the voltage V2 at node DCOUT is equal to DCIN−VT1+2*VA−VT2, where VT2 is the threshold voltage of diode D2.

Figure 5B:
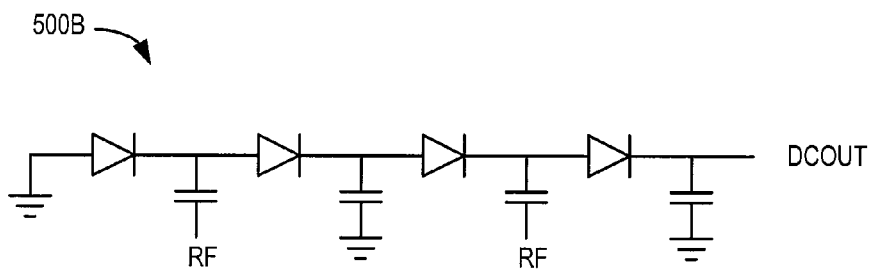
FIG. 5B is a schematic diagram of a single-ended Dickson RF "Charge Pump" rectifier according to prior art.

FIG. 5B is a schematic diagram of the single-ended Dickson RF "Charge-Pump" rectifier 500B. Rectifier 500B is constructed from a number of serially coupled stages of charge-pump stage 500A of FIG. 5A.

Figure 5C:
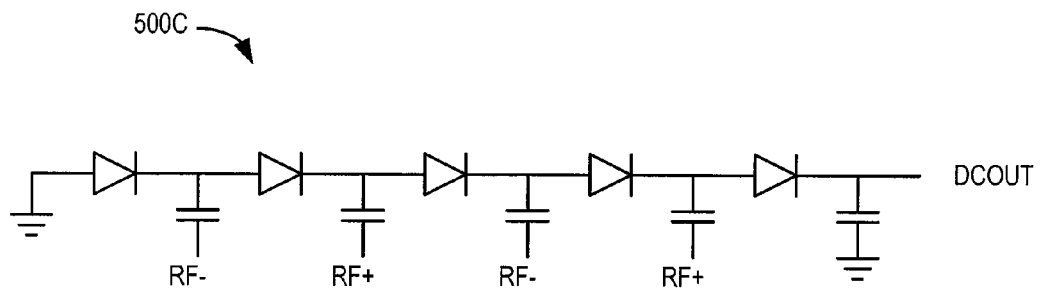
FIG. 5C is a schematic diagram of a differential Dickson RF "Charge Pump" rectifier according to prior art.

FIG. 5C is a schematic diagram of a differential Dickson RF "Charge Pump" rectifier 500C. Rectifier 500C is constructed from a number of serially coupled stages of charge-pump stage 500A of FIG. 5A. Operations of rectifier 500C are different from the operations of rectifier 500B, because charge-pump stage 500A is now pumped with not one RF signal, but rather with two pumping signals RF+ and RF−.

Figure 6A:
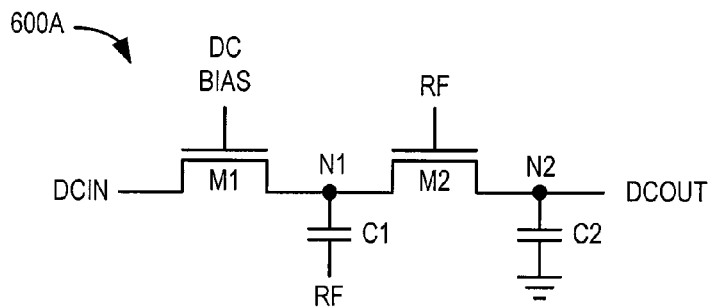
FIG. 6A is a schematic diagram of a conventional NMOS RF rectifier stage according to prior art.

FIG. 6A is a schematic diagram of a conventional NMOS RF rectifier stage 600A. Rectifier stage 600A includes two NMOS switching transistors M1 and M2 that are coupled in series at node N1. Capacitor C1 is connected between N1 and an RF input signal. Capacitor C2 is connected between a ground and an output terminal DCOUT.

When a gate bias voltage of transistor M1 is greater than DCIN+VT1, where VT1 is the threshold voltage of transistor M1, and the RF input signal is in the negative half of its AC cycle, transistor M1 turns ON, and voltage V1 at node N1 is equal to DCIN. During this time transistor M2 is OFF. When the voltage level RF input signal increases from −VA to +VA. transistor M1 turns OFF and transistor M2 turns ON. While transistor M2 is ON, it transfers charge from capacitor C1 to capacitor C2, and the voltage level V2 at node DCOUT is equal to DCIN+2*VA.

Figure 6B:
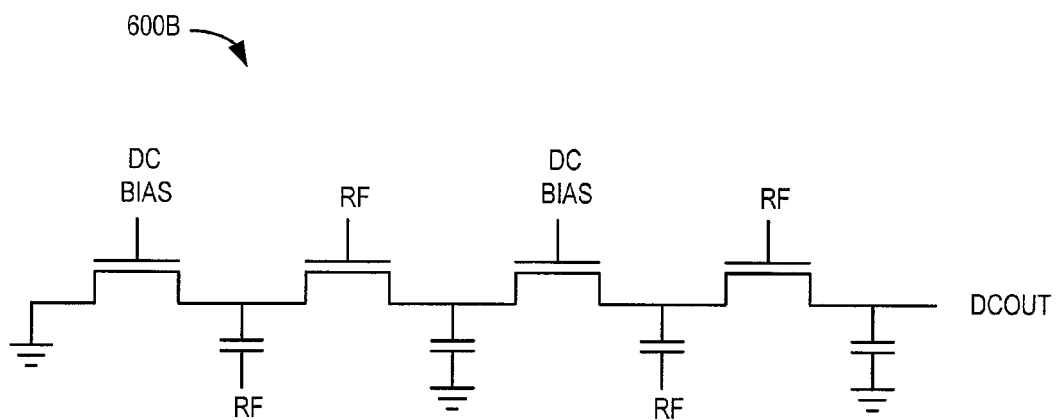
FIG. 6B is a schematic diagram of a single-ended NMOS RF rectifier according to prior art.

FIG. 6B is a schematic diagram of a single-ended NMOS RF rectifier 600B. Single-ended NMOS RF rectifier 600B is constructed from a number of serially coupled stages of NMOS rectifier stage 600A of FIG. 6A. By alternately turning ON and OFF transistors M1 and M2 of each stage element, a voltage level of the output node of each subsequent rectifier stage is pumped higher.

Figure 7A:
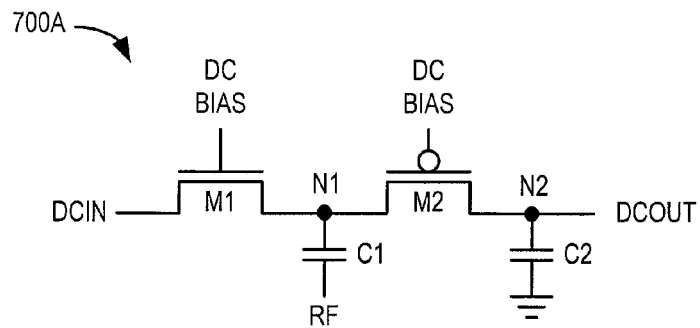
FIG. 7A is a schematic diagram of a conventional CMOS RF rectifier stage according to prior art.

FIG. 7A is a schematic diagram of a conventional CMOS RF rectifier stage 700A. Rectifier Stage 700A includes a pair CMOS switching transistors M1 and M2. Voltage biases are coupled to gates of transistors M1 and M2 to provide bias voltages thereto. NMOS transistor M1 and PMOS transistor M2 are coupled in series at node N1. Capacitor C1 is connected between N1 and a RF signal. Capacitor C2 is connected between ground and an output terminal N2 of transistor M2.

When a gate bias voltage of transistor M1 is greater than DCIN+VT1, where VT1 is a threshold voltage of transistor M1, and the RF input signal is in the negative half of its AC cycle, transistor M1 turns ON and voltage V1 at node N1 is equal to DCIN−VT1. During this time, transistor M2 is OFF. When the voltage level of the RF input signal increases from −VA to +VA, transistor M1 turns OFF and transistor M2 turns ON. While transistor M2 is ON, it transfers charge from capacitor C1 to capacitor C2, and the voltage level V2 at node DCOUT is equal to DCIN+2*VA.

Figure 7B:
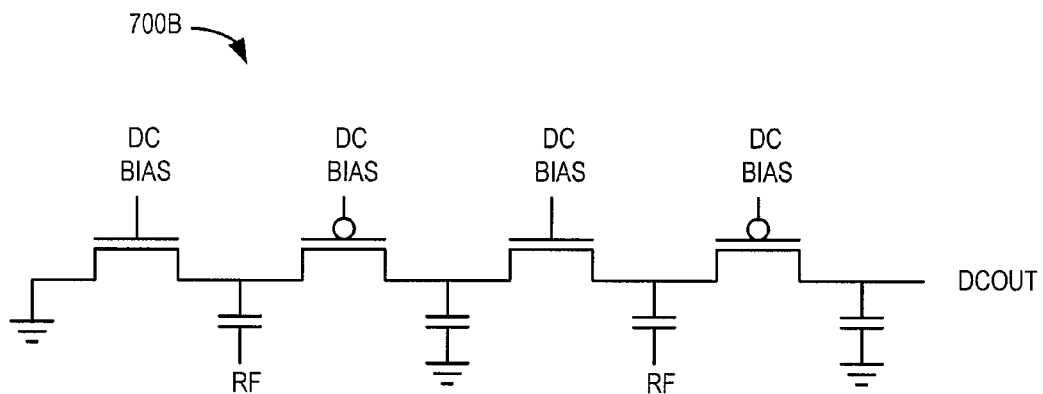
FIG. 7B is a schematic diagram of a single-ended CMOS RF rectifier according to prior art.

FIG. 7B is a schematic diagram of a single-ended CMOS RF rectifier 700B.

Single-ended CMOS RF rectifier 700B is constructed from a number of serially coupled stages of CMOS rectifier stage 700A of FIG. 7A. By alternately turning ON and OFF transistors M1 and M2 of each stage element, a voltage level of the output node of each subsequent rectifier stage is pumped higher.

Figure 8A:
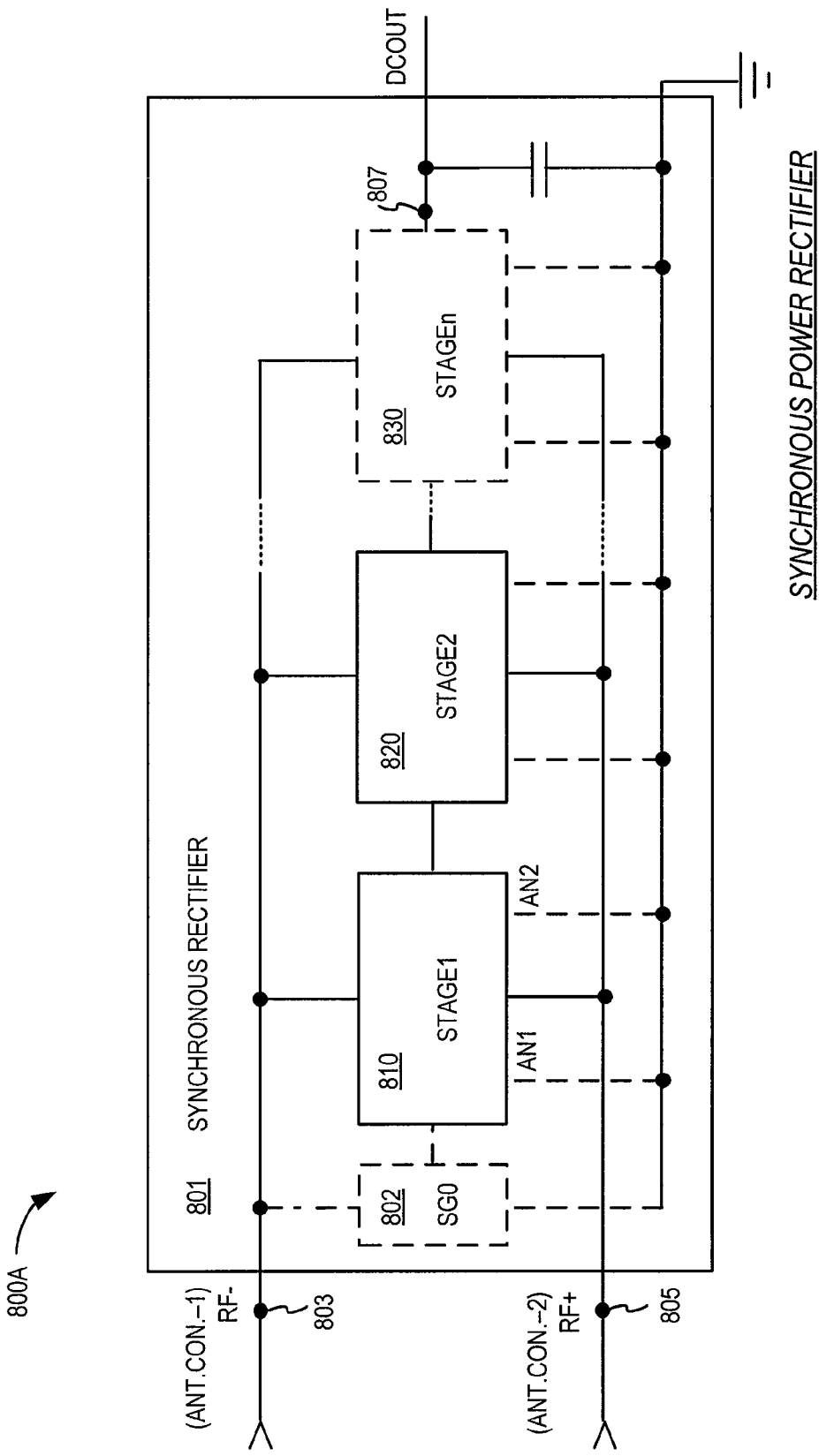
FIG. 8A is a diagram of a synchronous rectifier according to embodiments.

FIG. 8A is diagram 800A of synchronous power rectifier 801 for a Radio Frequency Identification tag circuit according to embodiments. Rectifier 801 includes antenna input node 803 and antenna input node 805. Input nodes 803 and 805 are configured to receive a RF− phase and a RF+ phase of the wirelessly received alternating RF signal respectively. The RF− phase of the RF signal is substantially opposite to the RF+ phase of the RF signal. A number of synchronous rectifier stages, Stage1 810, Stage2 820, and StageN 830 are coupled serially. Each synchronous rectifier Stage 810, 820, and 830 includes two synchronous elements. The stages are coupled to both phases RF− and RF+ of the RF signal to harvest energy. A zeroth Stage 802 provides an input to synchronous rectifier Stage 810. Output port 807 of the synchronous rectifier StageN 830 provides a rectified output DC-OUT of synchronous power rectifier 801. Stages of rectifier 801 other than the zeroth Stage 802 are made substantially identically.

Figure 8B:
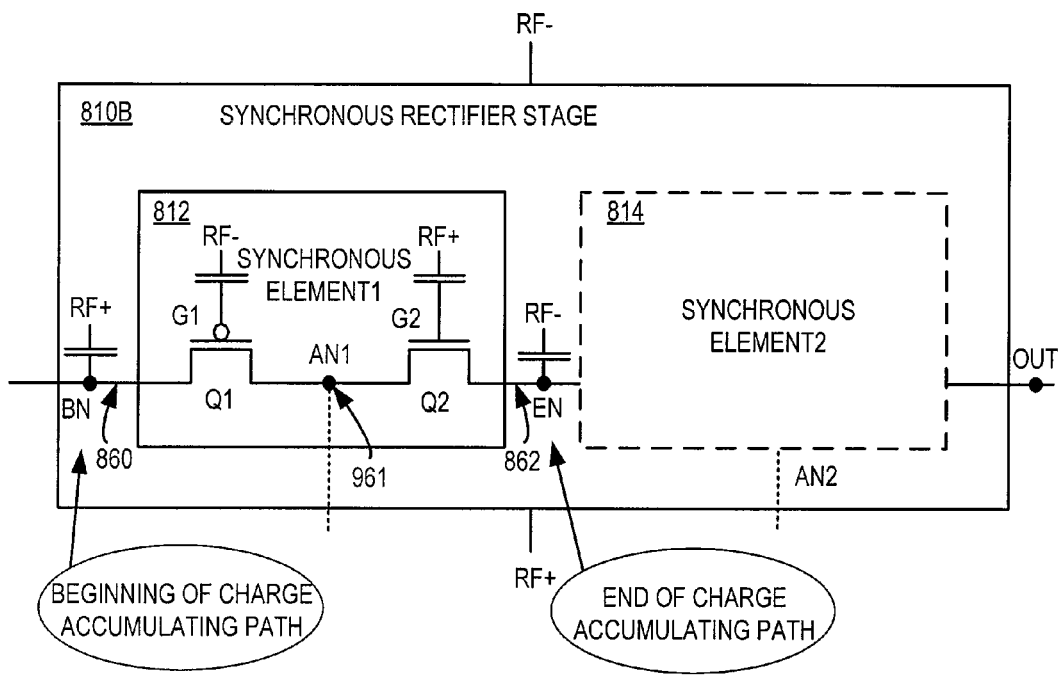
FIG. 8B is a diagram of a synchronous rectifier stage according to embodiments of FIG. 8A.
Figure 8C:
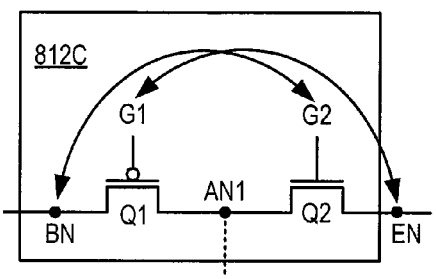
FIG. 8C is a schematic diagram of a synchronous rectifier element according to embodiments of FIG. 8B.

FIGS. 8B and 8C are diagrams of synchronous rectifier Stage 810B and its building blocks according to embodiments. Synchronous rectifier Stage 810B includes synchronous Element 812 and synchronous Elements 814. Synchronous Elements 812 and 814 are coupled serially. Synchronous rectifier Stage 810B receives both phases of the RF signal.

A synchronous element is a specific implementation of a differential CMOS charge-pump circuit. Synchronous Element 812 includes transistor Q1 and transistor Q2. Transistor Q1 has an input terminal at the beginning (BN) 860, an output terminal, and gate G1. Gate G1 is coupled to receive the phase RF−. Transistor Q2 has an input terminal, an output terminal at the ending (EN) 862, and gate G2. Gate G2 is coupled to receive the phase RF+. The input terminal of transistor Q2 is connected to the output terminal of transistor Q1 at intermediate node AN1. The connection between Q1 and Q2 forms a charge-accumulating path between BN 860 and EN 862. There is no charge-accumulating path between the beginning and the ending other than this path.

Gate G1 can couple to the output terminal of transistor Q2 to receive a DC bias voltage in addition to being coupled to receive the phase RF−. Another embodiment might couple G1 to either node AN1 or BN to receive a DC bias. Similarly, gate G2 can couple to the either AN, BN or EN to receive a DC bias voltage, in addition to being coupled to receive the phase RF+. The applied DC bias voltages are functions of an amplitude of the RF signal and may be controlled such that the DC output current of the Power Rectifier is substantially maximized for a given RF input power.

A transistor that is ON may be strongly ON or weakly ON, depending on its overdrive voltage (VOV). VOV is the difference between the gate to source voltage of the transistor and its threshold voltage. The channel current of an ON transistor is higher when its VOV is high and lower when its VOV is low. Also, an OFF transistor may not be completely OFF, and will have some low value of channel current depending on its overdrive voltage. The channel current of an OFF transistor is also lower when its VOV is low, and higher when its VOV is high.

The power conversion efficiency of a rectifier is higher when its ON transistors have high VOV and are thus strongly ON, and its OFF transistors have low VOV, and are thus substantially OFF. The Synchronous Element has RF coupled to gates, G1 and G2, to increase the overdrive when the transistor should be ON and decrease the overdrive when the transistor should be OFF. This improves the power conversion efficiency of the element.

Circuit topology of the synchronous Element 812 and synchronous Elements 814 is substantially identical. They differ from each other due to differently coupled RF signal phases. When a circuit element, a gate, or input terminal of the synchronous Element 812 receives the phase RF− or the phase RF+ of the RF signal, the corresponding circuit element of the synchronous Element 814 receives the opposite phase, phase RF+, or phase RF− of the RF signal respectively.

Synchronous Element 812 is constructed from a complementary pair of PMOS and NMOS transistors, where transistor Q1 is a PMOS, and transistor Q2 is an NMOS. Optionally, synchronous Element 812 may be constructed in such a way that transistor Q1 is the NMOS and transistor Q2 is the PMOS.

Any synchronous rectifier stage from Stage1 810 through StageN 830 begins at the input terminal of transistor Q1 of synchronous Element1 and ends at the output terminal of transistor Q2 of synchronous Element2.

Zeroth Stage 802 includes one transistor (not shown) and it has the same polarity as transistor Q2 in a synchronous element. The transistor has a gate that is coupled to the phase RF−, a drain that is connected to ground, and a source that is coupled to input terminal 860 of the synchronous Element1 810.

As mentioned earlier, an input terminal of transistor Q2 of a synchronous element is connected to an output terminal of transistor Q1 of the same synchronous element to form an intermediate node AN. Each of the synchronous elements include such an intermediate node AN. There are three general configurations to treat these intermediate nodes AN. In option one, the intermediate nodes AN are left to float. In option two, the intermediate nodes AN are coupled together and are left to float. In option three, the intermediate nodes AN are coupled together and are coupled to ground. Each of the configurations provides unique performance advantages depending on the phase and amplitude relationship between RF− and RF+. In option one, the performance advantage is due to an improved forward conductance. In option two, the performance advantage is due to an improved turnoff efficiency. In option three, the performance advantage is due to a balance between an improved forward conductance and an improved turnoff efficiency.

FIG. 9A is a conceptual representation 900A of an averaging node of synchronous rectifier element of FIG. 8B. A synchronous rectifier element, as mentioned earlier, is a specific implementation of a differential CMOS charge-pump circuit. A pair of differential pumping signals operates the CMOS charge-pump differentially. A single antenna has two nodes, antenna connection-1 (ANT.CON.-1), and antenna connection-2 (ANT.CON.-2). ANT.CON.-1 supplies the phase RF−. ANT.CON.-2 supplies the phase RF+. The phase RF− and the phase RF+ are complementary. Between phase RF− and phase RF+ there is a conceptual node called an "averaging node". An instantaneous signal level on this node is an average of the signal amplitudes of phase RF− and phase RF+. Equivalents of these nodes are interchangeably designated as an Averaging Node (AN) or an intermediate node in this disclosure and drawings.

FIG. 9B is a schematic diagram 900B of the synchronous rectifier Element of 812 of FIG. 8B that shows the location of the averaging node (AN) 961. Averaging node 961 is formed at a point where the input terminal of the transistor Q2 is connected to the output terminal of the transistor Q1. Node 961 is capacitively coupled to the phase RF− and the phase RF+, and to the substrate of the IC. An instantaneous signal level on node 961 is a sum of a weighed average of the signal amplitudes of phase RF− and the phase RF+, and a DC voltage component that is due to charge accumulation.

Figure 9C:
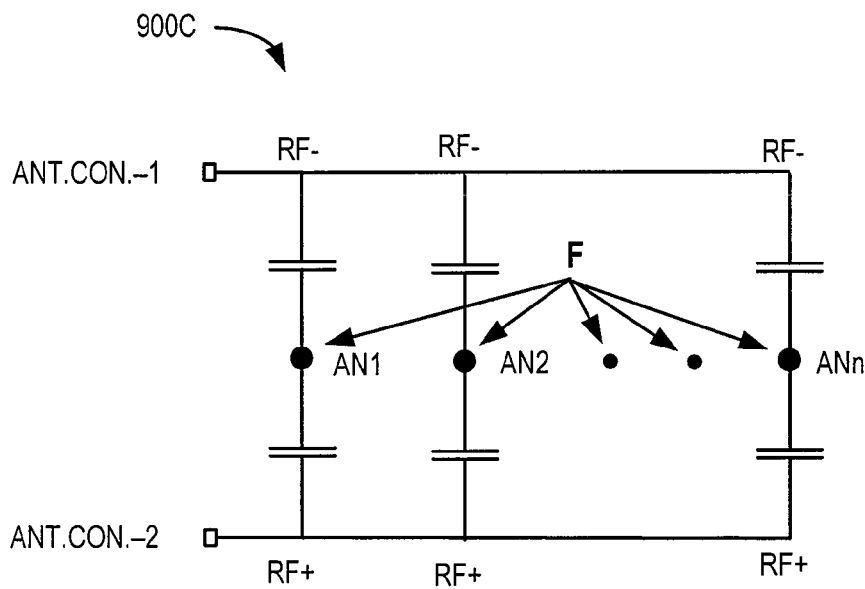
FIG. 9C is a conceptual representation of a synchronous rectifier of FIG. 8A according to an embodiment that is configured for "Nodal Averaging".
Figure 9D:
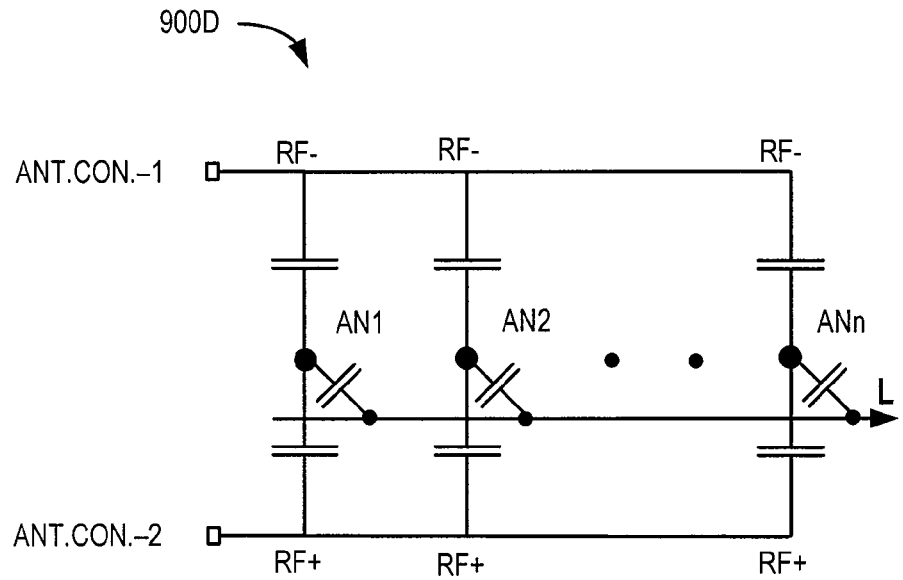
FIG. 9D is a conceptual representation of a synchronous rectifier of FIG. 8A according to an embodiment that is configured for "Local Averaging".
Figure 9E:
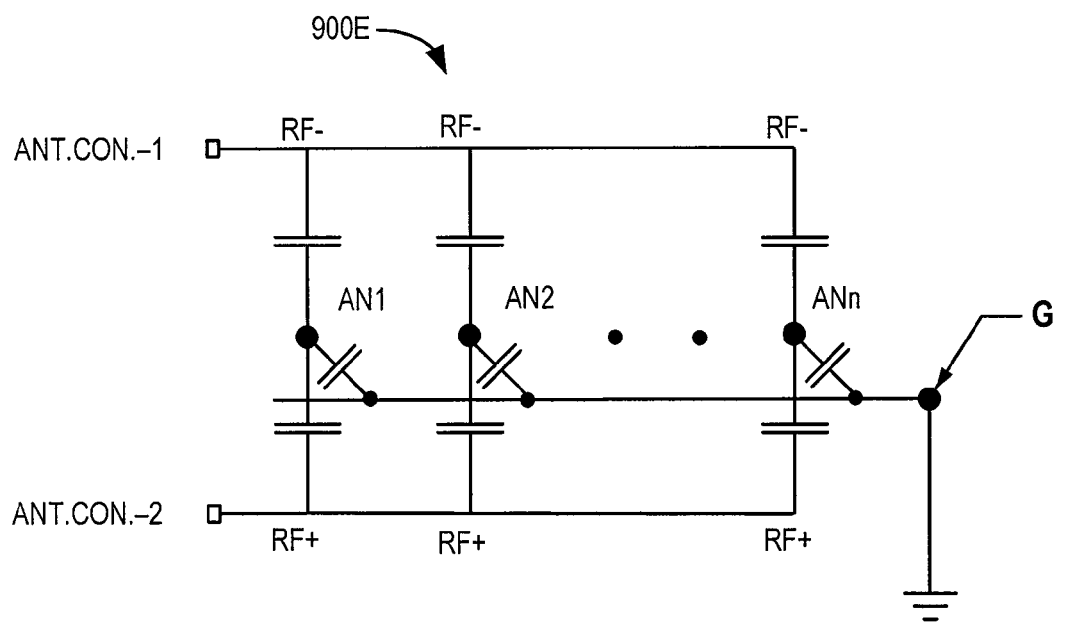
FIG. 9E is a conceptual representation of a synchronous rectifier of FIG. 8A according to an embodiment that is configured for "Global Averaging".

FIGS. 9C, 9D and 9E are a conceptual representations of a synchronous rectifier of FIG. 8A according to three different embodiments. Diagram 900C shows an embodiment that is configured for "Nodal Averaging". In the "Nodal Averaging" configuration, the individual nodes AN1 through ANn are left to float. Diagram 900D shows an embodiment that is configured for "Local Averaging". In the "Local Averaging" configuration, the individual nodes AN1 through ANn are coupled together and they float together. Diagram 900E shows an embodiment that is configured for "Global Averaging". In the "Global Averaging" configuration, the individual nodes AN1 through ANn are coupled together and they are connected to ground.

Figure 10A:
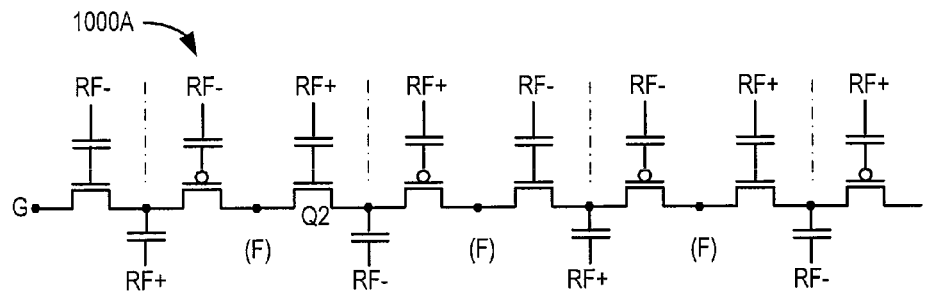
FIG. 10A is a simplified schematic diagram of a synchronous rectifier according to an embodiment, which is further configured for "Nodal Averaging" and showing phase relationship among rectifier elements.

FIG. 10A is a simplified schematic diagram of a synchronous rectifier according to embodiment 900C. Schematic 1000A shows phase relationships among rectifier elements.

Figure 10B:
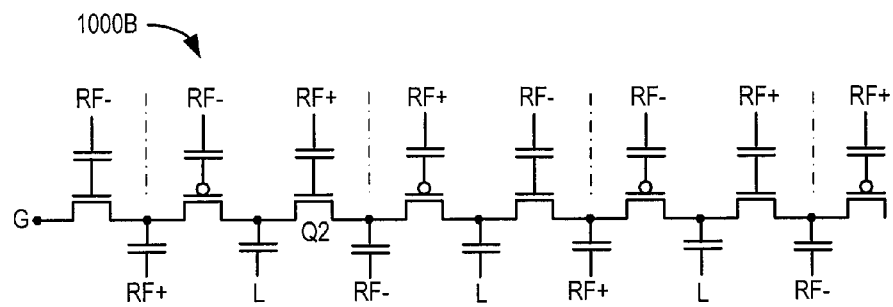
FIG. 10B is a simplified schematic diagram of a synchronous rectifier according to an embodiment, which is further configured for "Local Averaging" and showing phase relationship among rectifier elements.

FIG. 10B is a simplified schematic diagram of a synchronous rectifier according to embodiment 900D. Schematic 1000B shows phase relationships among rectifier elements.

Figure 10C:
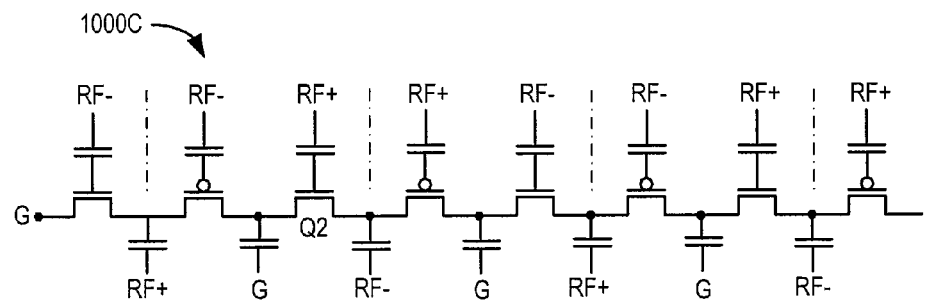
FIG. 10C is a simplified schematic diagram of a synchronous rectifier according to an embodiment, which is further configured for "Global Averaging" and showing phase relationship among rectifier elements.

FIG. 10C is a simplified schematic diagram of a synchronous rectifier according to embodiment 900E. Schematic 1000C shows phase relationships among rectifier elements.

It is noteworthy that phase relationships for the different averaging options remain the same. Only treatments of the averaging nodes are different.

Figure 11A:
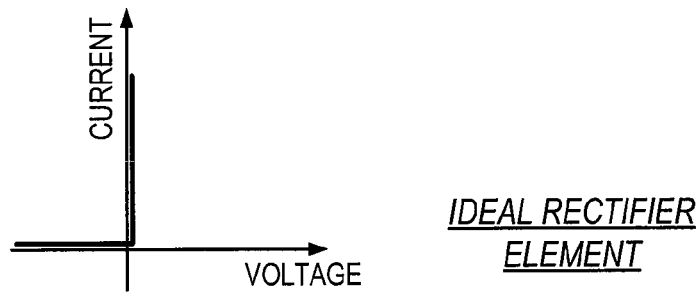
FIG. 11A is a Current Voltage (I/V) diagram of an ideal rectifier element.

FIGS. 11A through 11D are Current Voltage (I/V) diagrams of different rectifier elements generally used for low voltage rectifications. The horizontal axis voltage represents the difference between the voltages at the input and the output of the rectifier element. FIG. 11A shows the I/V diagram of an ideal rectifier element. The ideal rectifier element has no forward drop or threshold and there is no current conductance in a reverse direction. No practical device possesses such characteristics; however, different device technologies and design techniques are used to approximate such a behavior.

Figure 11B:
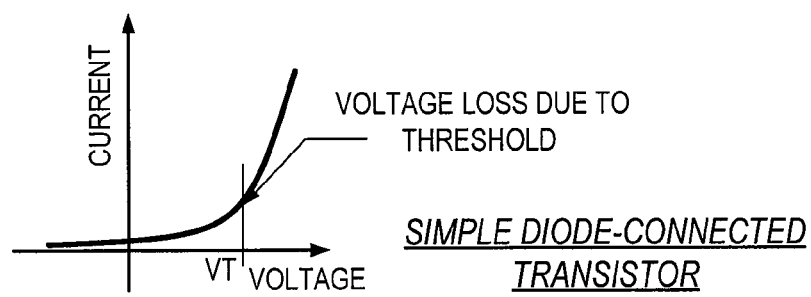
FIG. 11B is a Current Voltage (I/V) diagram of a diode-connected transistor rectifier element.

FIG. 11B is the I/V diagram of a diode-connected transistor rectifier element. The diode-connected transistor rectifier element suffers from significant voltage loss due to threshold voltage.

Figure 11C:
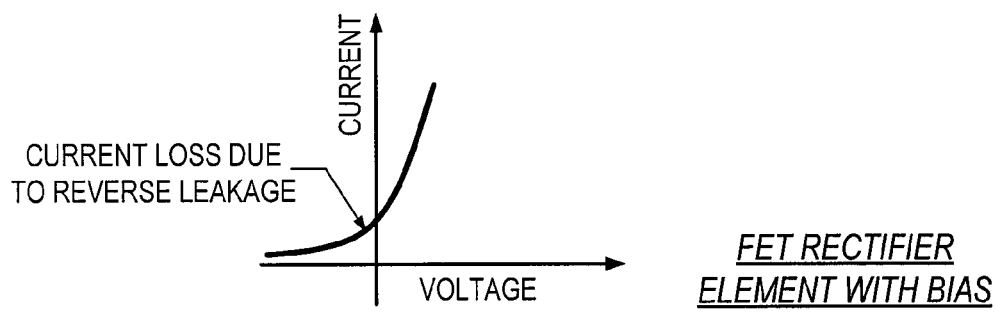
FIG. 11C is a Current Voltage (I/V) diagram of a biased FET transistor rectifier element.

FIG. 11C is the I/V diagram of a biased FET transistor rectifier element.

FET transistor rectifier elements have lower voltage losses due to threshold voltage; however, they still exhibit significant losses due to reverse leakage.

Figure 11D:
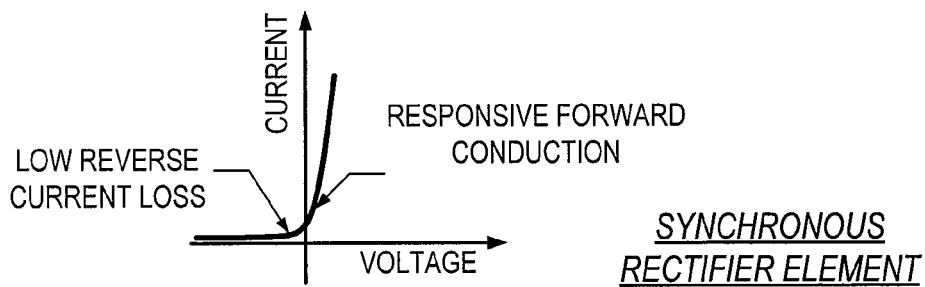
FIG. 11D is a Current Voltage (I/V) diagram of a synchronous rectifier element according to embodiments.

FIG. 11D is the I/V diagram of a synchronous rectifier element according to embodiments. The I/V diagram looks more like the ideal case because the gate voltage moves synchronously with the input-to-output voltage. By using a pair of complementary switching transistors where the gates of these transistors couple to an RF signal, the overdrive voltage is a function of the RF signal and the DC bias. The DC bias voltage is controlled such that the amount of an average current through the switching transistor is substantially maximized for a selected RF input power.

Figure 12A:
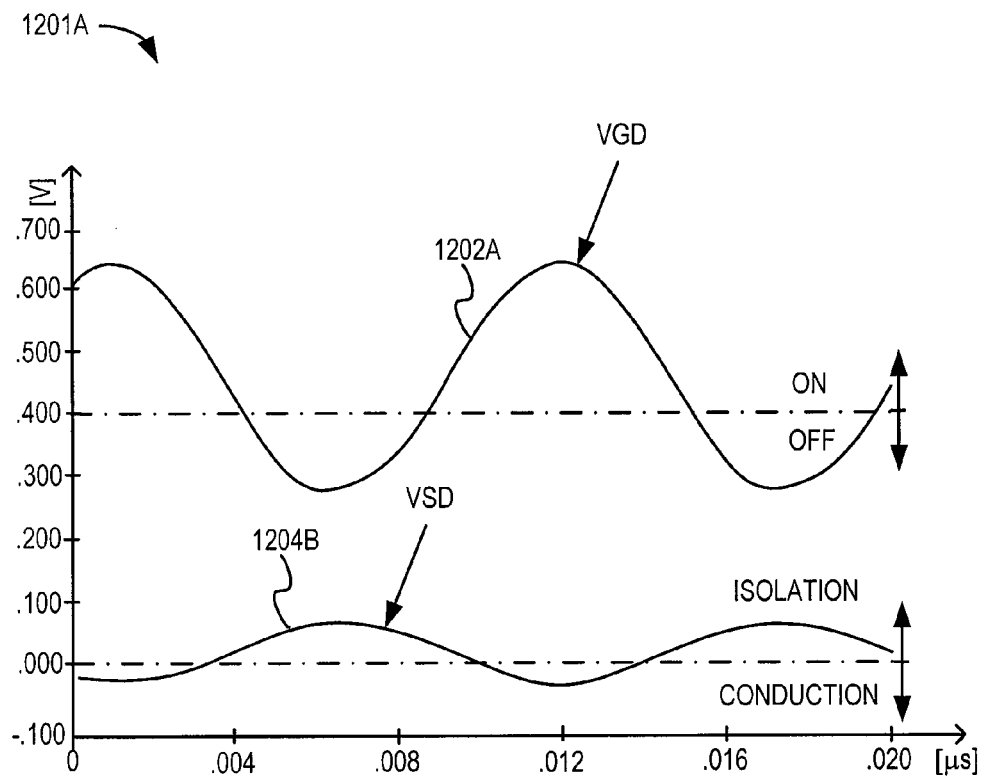
FIG. 12A is a diagram showing some representative signals within the synchronous rectifier of FIGS. 9C and 10A with "Nodal Averaging".

FIG. 12A is a diagram of simulation results 1201A of synchronous rectifier of FIGS. 9C and 10A with "Nodal Averaging". Simulation results 1201A show signal gate-drain voltage (VGD) 1202A and source drain voltage (VSD) 1204A of transistor Q2 as function of time. It should be noted, signal amplitudes of VGD 1202A and VSD 1204A are mismatched due to imbalance in parasitic capacitance.

Figure 12B:
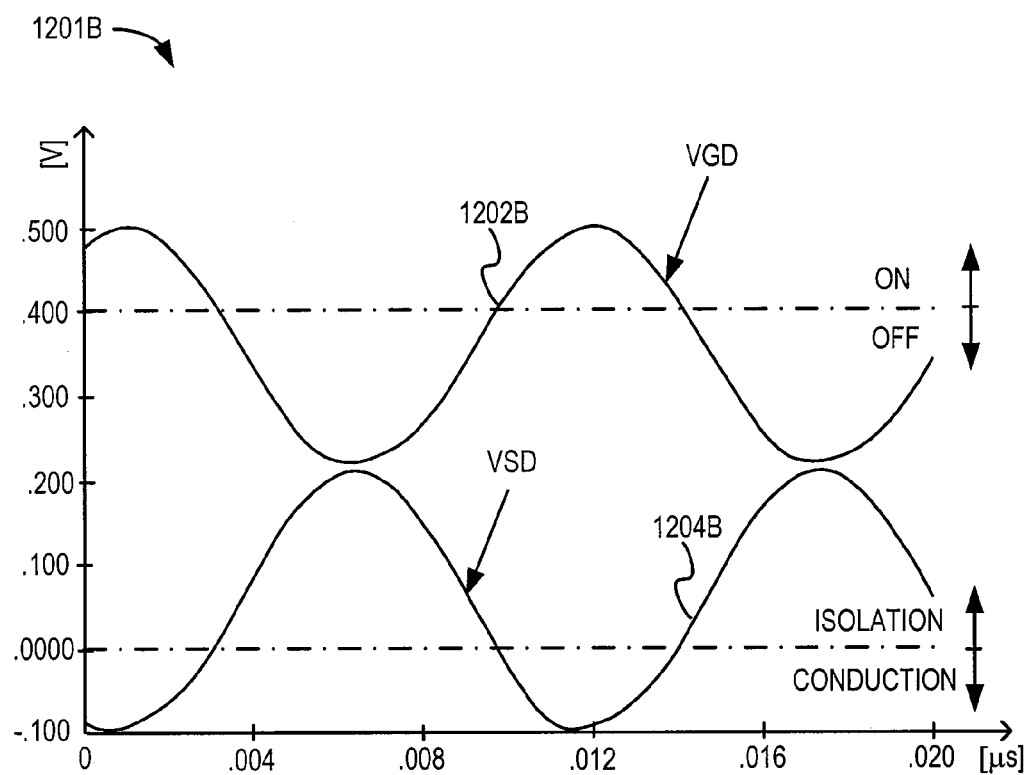
FIG. 12B is a diagram showing some representative signals within the synchronous rectifier of FIGS. 9D and 10B with "Local Averaging".

FIG. 12B is a diagram of simulation results 1201B of synchronous rectifier of FIGS. 9D and 10B with "Local Averaging". Simulation results 1201B show signal gate-drain voltage (VGD) 1202B and source drain voltage (VSD) 1204B of transistor Q2 as function of time.

Figure 12C:
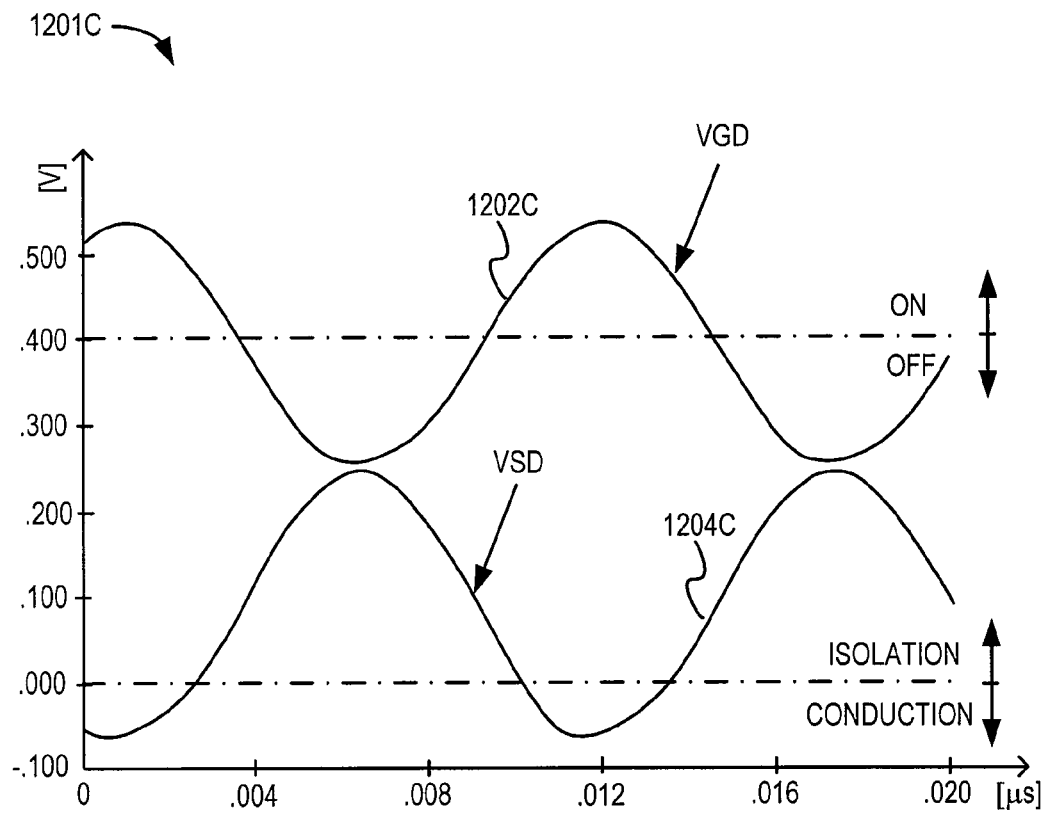
FIG. 12C is a diagram showing some of representative signals within the synchronous rectifier of FIGS. 9E and 10C with "Global Averaging".

FIG. 12C is a diagram of simulation results 1201C of synchronous rectifier of FIGS. 9E and 10C with "Global Averaging". Simulation results 1201C show signal gate-drain voltage (VGD) 1202C and source drain voltage (VSD) 1204C of transistor Q2 as function of time.

Figure 13:
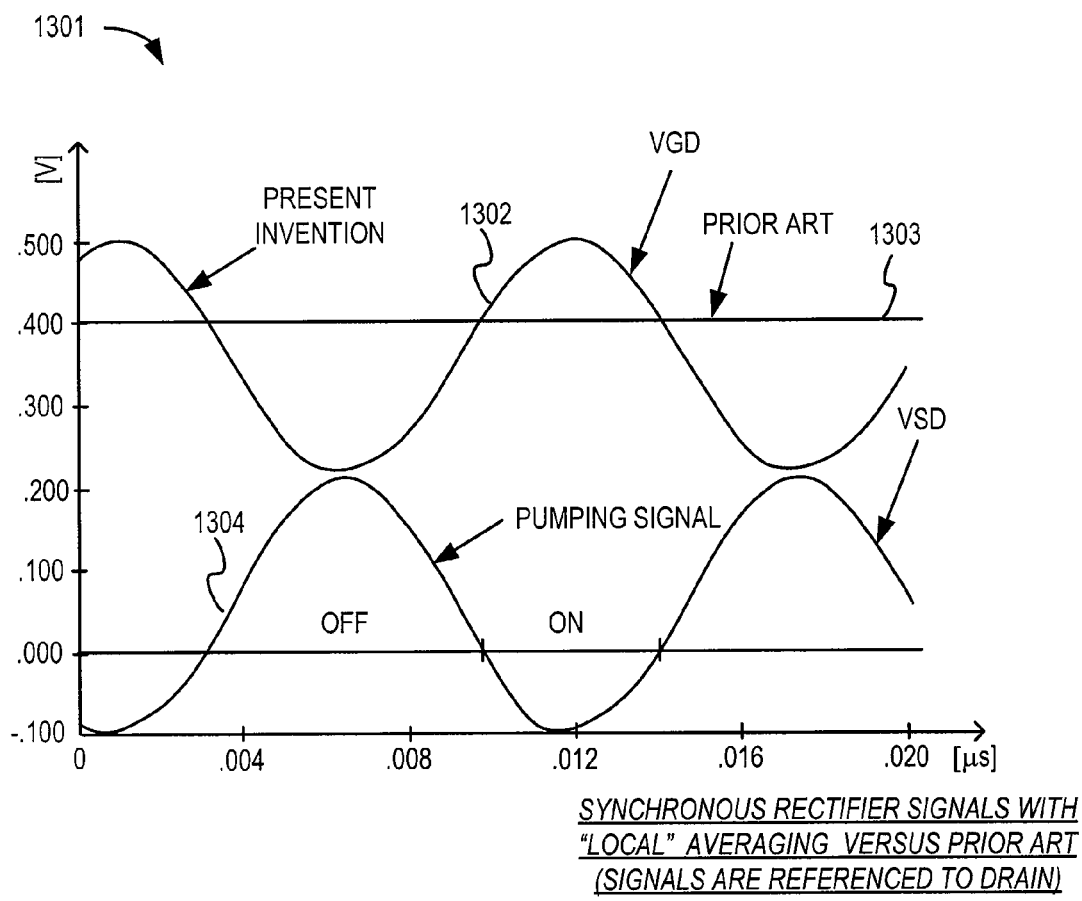
FIG. 13 is a diagram showing comparisons between some representative signals within the synchronous rectifier of FIGS. 9D and 10B versus a prior art rectifier.

FIG. 13 is a diagram of comparisons 1301 between some of the representative signals within the synchronous rectifier of FIG. 10B and a prior art rectifier. Switching signal VGD 1302 reaches a maximum when transistor Q2 is ON and VSD 1304 less than zero Volts. The switching signal stays constant in the prior art, see signal 1303. Switching signal VGD 1302 reaches a minimum when transistor Q2 is off, and VSD 1304 higher than zero Volt, while a switching signal stays constant in the prior art.

Figure 14:
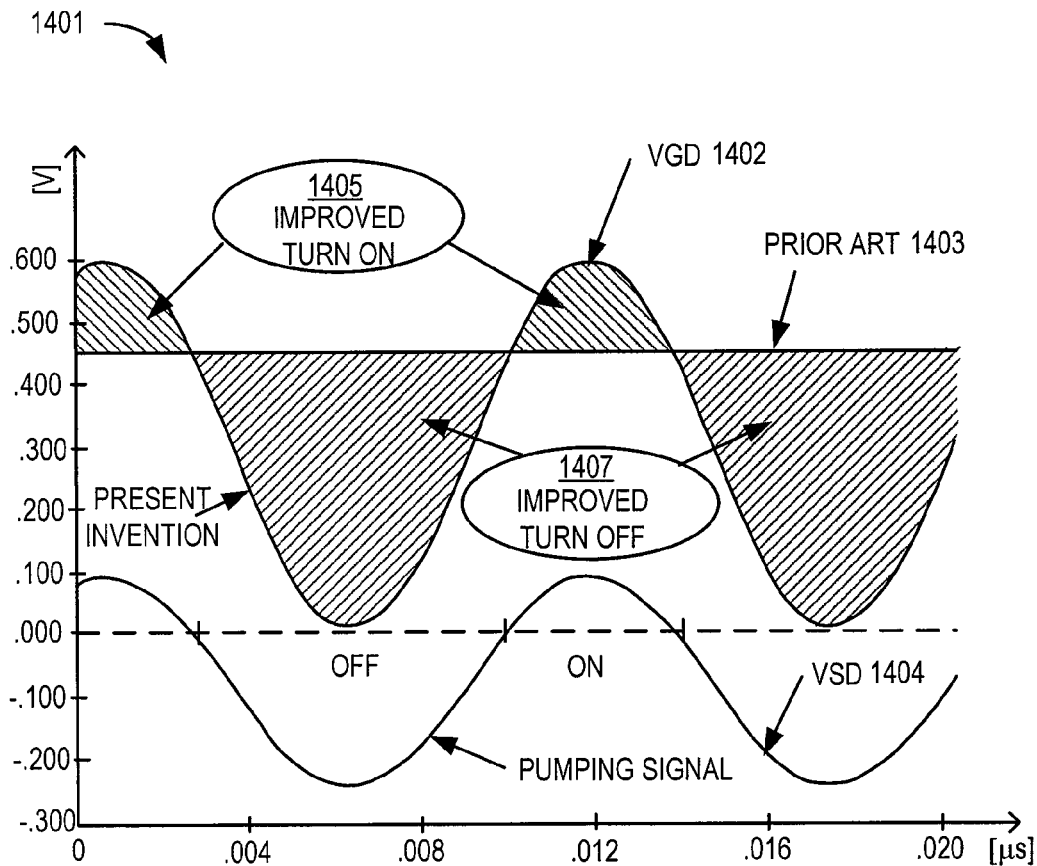
FIG. 14 is a diagram showing improvement in forward conductance with the use of the synchronous rectifier versus a prior art rectifier.

FIG. 14 is a diagram showing improvement in forward conductance and reverse leakage or turn off efficiency with the use of the synchronous rectifier versus a prior art rectifier. A conduction should occur when the VDS 1404 is higher than zero Volt, while a reverse leakage can occur when the VDS 1404 is lower than zero Volts. Diagram 1401 shows control voltage of the present invention VGD 1402 and control voltage of prior art 1403. Areas 1405 represent improvements in forward conductance. During this time VGS 142 is higher than the control voltage of a prior art 1403. Areas 1407 represent improvements in reverse leakage, during this time VGS 142 is lower than the control voltage of a prior art 1403. These improvements in forward conductance and reverse leakage are also represented in FIG. 11D.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions, and/or properties disclosed herein. The following claims define certain combinations and subcombinations, which are regarded as novel and non-obvious. Additional claims for other combinations and subcombinations of features, functions, elements, and/or properties may be presented in this or a related document.

The invention claimed is:

1. A power rectifier for a Radio Frequency Identification tag circuit, comprising:
a first antenna input node for receiving a first phase of an alternating RF wireless signal;

a second antenna input node for receiving a second phase of the alternating RF wireless signal which is substantially opposite to the first phase;
a plurality of serially coupled stages, at least one of the stages including
  a first synchronous element with a first beginning coupled to receive the second phase and a first ending, the first synchronous element including:
    a first transistor having an input terminal at the first beginning, an output terminal, and a gate coupled to receive the first phase; and
    a second transistor having an input terminal, an output terminal at the first ending, and a gate coupled to receive the second phase, in which the input terminal of the second transistor is connected to the output terminal of the first transistor at a first intermediate node so as to form a first charge-accumulating path between the first beginning and the first ending, and there is no charge-accumulating path between the first beginning and the first ending other than the first path; and
  a second synchronous element with a second beginning to receive a first phase and a second ending, the second synchronous element including:
    a third transistor having an input terminal at the second beginning, an output terminal, and a gate coupled to receive the second phase;
    a fourth transistor having an input terminal, an output terminal at the second ending, and a gate coupled to receive the first phase, in which the input terminal of the fourth transistor is connected to the output terminal of the third transistor at a second intermediate node so as to form a second charge-accumulating path between the second beginning and the second ending, and there is no charge-accumulating path between the second beginning and the second ending other than the second path; and
    in which the second beginning is coupled to the first ending.

2. The rectifier of claim 1, in which
at least two of the plurality of stages are substantially identical.

3. The rectifier of claim 1, in which
the gate of the first transistor is coupled to the output terminal of one of the first and the second transistors to receive a DC bias voltage, in addition to being coupled to receive the first phase.

4. The rectifier of claim 3, in which
an amount of the DC bias voltage is a function of an amplitude of the RF signal.

5. The rectifier of claim 4, in which
the amount of the DC bias voltage is controlled such that an amount of an average current through the first transistor is substantially maximized for a given RF input power.

6. The rectifier of claim 1, in which
the gate of the second transistor is coupled to the input terminal of one of the first and the second transistors to receive a DC bias voltage, in addition to being coupled to receive the second phase.

7. The rectifier of claim 6, in which
an amount of the DC bias voltage is a function of an amplitude of the RF signal.

8. The rectifier of claim 7, in which
the amount of the DC bias voltage is controlled such that an amount of an average current through the first transistor is substantially maximized.

9. The rectifier of claim 1, in which
the first transistor and the second transistor are one of a PMOS-NMOS pair and NMOS-PMOS pair, respectively.

10. The rectifier of claim 1, in which
the first and second intermediate nodes are floating.

11. The rectifier of claim 1, in which
the first and second intermediate nodes are coupled together, and are floating together.

12. The rectifier of claim 1, in which
the first and second intermediate nodes are coupled together, and are coupled to ground.

13. A Radio Frequency Identification tag circuit, comprising:
  a first antenna input node for receiving a first phase of an alternating RF wireless signal;
  a second antenna input node for receiving a second phase of the alternating RF wireless signal which is substantially opposite to the first phase;
  a plurality of serially coupled stages, at least one of the stages including:
    a first synchronous element with a first beginning coupled to receive the second phase and a first ending, the first synchronous element including:
      a first transistor having an input terminal at the first beginning, an output terminal, and a gate coupled to receive the first phase; and
      a second transistor having an input terminal, an output terminal at the first ending, and a gate coupled to receive the second phase, in which the input terminal of the second transistor is connected to the output terminal of the first transistor at a first intermediate node so as to form a first charge-accumulating path between the first beginning and the first ending, and there is no charge-accumulating path between the first beginning and the first ending other than the first path; and
    a second synchronous element with a second beginning to receive the first phase and a second ending, the second synchronous element including:
      a third transistor having an input terminal at the second beginning, an output terminal, and a gate coupled to receive the second phase;
      a fourth transistor having an input terminal, an output terminal at the second ending, and a gate coupled to receive the first phase, in which the input terminal of the fourth transistor is connected to the output terminal of the third transistor at a second intermediate node so as to form a second charge-accumulating path between the second beginning and the second ending, and there is no charge-accumulating path between the second beginning and the second ending other than the second path; and
      in which the second beginning is coupled to the first ending.

14. The RFID tag circuit of claim 13, in which
the transistors are one of PMOS transistors and NMOS transistors.

15. A rectifier for a Radio Frequency Identification tag circuit, comprising:
  a first antenna input node for receiving a first phase of an alternating RF wireless signal;
  a second antenna input node for receiving a second phase of the alternating RF wireless signal which is substantially opposite to the first phase;

a zeroth stage transistor having an input terminal connected to ground, an output terminal, and a gate coupled to receive the first phase;

a plurality of serially coupled stages, at least one of the stages including:

a first synchronous element with a first beginning coupled to receive the second phase and a first ending, the first synchronous element including:

a first transistor having an input terminal at the first beginning coupled to the output terminal of the zeroth stage transistor, an output terminal, and a gate coupled to receive the first phase;

a second transistor having an input terminal, an output terminal at the first ending, and a gate coupled to receive the second phase, in which the input terminal of the second transistor is connected to the output terminal of the first transistor at a first intermediate node so as to form a first charge-accumulating path between the first beginning and the first ending, and there is no charge-accumulating path between the first beginning and the first ending other than the first path; and a second synchronous element with a second beginning to receive the first phase and a second ending, the second synchronous element including:

a third transistor having an input terminal at the second beginning, an output terminal, and a gate coupled to receive the second phase;

a fourth transistor having an input terminal, an output terminal at the second ending, and a gate coupled to receive the first phase, in which the input terminal of the fourth transistor is connected to the output terminal of the third transistor at a second intermediate node so as to form a second charge-accumulating path between the second beginning and the second ending, and there is no charge-accumulating path between the second beginning and the second ending other than the second path; and in which the second beginning is coupled to the first ending.

\* \* \* \* \*

UNITED STATES PATENT AND TRADEMARK OFFICE
CERTIFICATE OF CORRECTION

| | | |
|---|---|---|
| PATENT NO. | : 8,115,597 B1 | |
| APPLICATION NO. | : 12/042117 | |
| DATED | : February 14, 2012 | |
| INVENTOR(S) | : Oliver et al. | |

It is certified that error appears in the above-identified patent and that said Letters Patent is hereby corrected as shown below:

1) Please delete "324" in column 5, line 20, and insert -- 324. --, therefor.

2) Below "element." in column 9, line 63-65, please delete "FET transistor rectifier elements have lower voltage losses due to threshold voltage; however, they still exhibit significant losses due to reverse leakage." and insert the same after "element." on col. 9, Line 62 as a continuation of same paragraph.

Signed and Sealed this
Nineteenth Day of June, 2012

David J. Kappos
*Director of the United States Patent and Trademark Office*